United States Patent
Hermann et al.

(10) Patent No.: US 10,908,300 B2
(45) Date of Patent: Feb. 2, 2021

(54) NAVIGATION METHOD, NAVIGATION DEVICE AND NAVIGATION SYSTEM

(71) Applicant: VOLKSWAGEN AKTIENGESELLSCHAFT, Wolfsburg (DE)

(72) Inventors: Frank Hermann, Berlin (DE); Ronald Koch, Berlin (DE); Volker Remuss, Berlin (DE); Alexander Witzel, Meine (DE)

(73) Assignee: Volkswagen Aktiengesellschaft

( * ) Notice: Subject to any disclaimer, the term of this patent is extended or adjusted under 35 U.S.C. 154(b) by 172 days.

(21) Appl. No.: 16/087,234

(22) PCT Filed: Mar. 22, 2017

(86) PCT No.: PCT/EP2017/056825
§ 371 (c)(1),
(2) Date: Sep. 21, 2018

(87) PCT Pub. No.: WO2017/174360
PCT Pub. Date: Oct. 12, 2017

(65) Prior Publication Data
US 2019/0113630 A1   Apr. 18, 2019

(30) Foreign Application Priority Data

Apr. 7, 2016   (DE) .................. 10 2016 205 843

(51) Int. Cl.
*G01S 19/49*   (2010.01)
*G01S 5/00*   (2006.01)
(Continued)

(52) U.S. Cl.
CPC ............ *G01S 19/49* (2013.01); *G01S 5/0036* (2013.01); *G01S 19/03* (2013.01); *G01S 19/08* (2013.01);
(Continued)

(58) Field of Classification Search
CPC .......... G01S 19/49; G01S 19/03; G01S 19/08; G01S 19/421; G01S 19/428; G01S 19/13;
(Continued)

(56) References Cited

U.S. PATENT DOCUMENTS 6,329,945 B1   12/2001   Hynes
2007/0032950 A1*   2/2007   O'Flanagan ............ G01S 19/47
701/472
(Continued)

FOREIGN PATENT DOCUMENTS

CN   102735251 A   10/2012
EP   2620787 A2   7/2013
(Continued)

OTHER PUBLICATIONS

Search Report for International Patent Application No. PCT/EP2017/056825; dated Jul. 6, 2017.

*Primary Examiner* — Harry K Liu
(74) *Attorney, Agent, or Firm* — Barnes & Thornburg LLP

(57) ABSTRACT

A navigation method that includes receiving a satellite navigation signal from a satellite navigation system, determining a position based on the received satellite navigation signal, obtaining quality data indicative of a satellite navigation signal quality as a function of a location information, and correcting the determined position based on the satellite navigation signal quality.

14 Claims, 3 Drawing Sheets

(51) Int. Cl.
*G01S 19/42* (2010.01)
*G01S 19/03* (2010.01)
*G01S 19/08* (2010.01)

(52) U.S. Cl.
CPC .......... *G01S 19/421* (2013.01); *G01S 19/428* (2013.01); *G01S 5/0027* (2013.01)

(58) Field of Classification Search
CPC ..... G01S 5/0036; G01C 21/28; G01C 21/165; G01C 15/00
USPC .................................................... 342/357.32
See application file for complete search history.

(56) References Cited

U.S. PATENT DOCUMENTS

| | | | |
|---|---|---|---|
| 2008/0074317 A1 | 3/2008 | Harper et al. | |
| 2008/0293426 A1 | 11/2008 | Kim et al. | |
| 2016/0280401 A1* | 9/2016 | Driscoll | G01C 21/24 |
| 2016/0282473 A1* | 9/2016 | Driscoll | G01S 19/49 |
| 2018/0252818 A1* | 9/2018 | Sato | G01S 19/07 |

FOREIGN PATENT DOCUMENTS

| | | |
|---|---|---|
| WO | 2010073113 A1 | 7/2010 |
| WO | 2013067526 A1 | 5/2013 |
| WO | 2015118819 A1 | 8/2015 |
| WO | 2015126499 A2 | 8/2015 |

* cited by examiner

NAVIGATION METHOD, NAVIGATION DEVICE AND NAVIGATION SYSTEM

PRIORITY CLAIM

This patent application is a U.S. National Phase of International Patent Application No. PCT/EP2017/056825, filed 22 Mar. 2017, which claims priority to German Patent Application No. 10 2016 205 843.6, filed 7 Apr. 2016, the disclosures of which are incorporated herein by reference in their entireties.

SUMMARY

Illustrative embodiments relate to a navigation method, a navigation device and a navigation system, as are used in transportation vehicles, in particular.

BRIEF DESCRIPTION OF THE DRAWINGS

Exemplary embodiments are now described by way of example and with reference to the accompanying drawings, in which.

DETAILED DESCRIPTION

Figure 1:
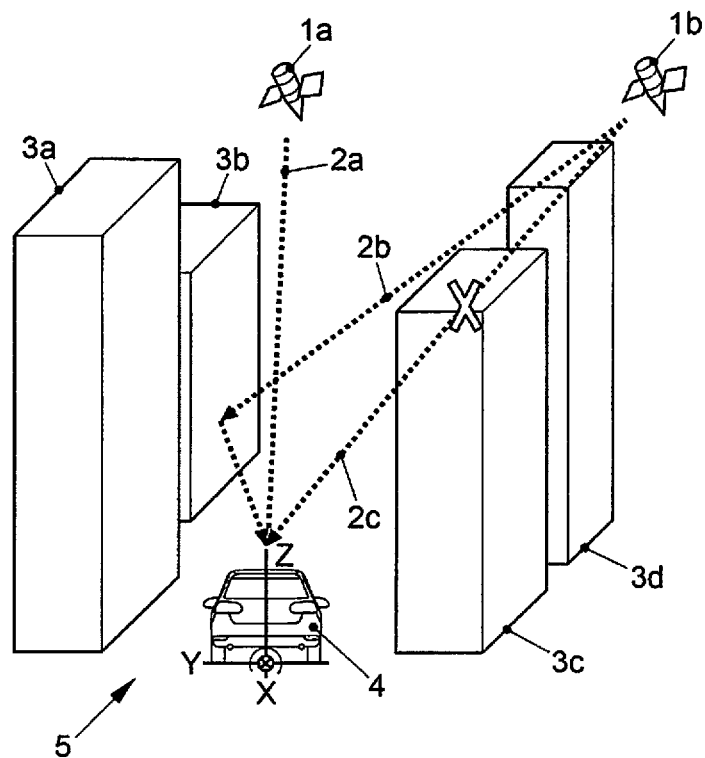
FIG. 1 illustrates schematically the shadowing of satellite signals by structures.

Transportation vehicle navigation systems that are fixedly integrated in a transportation vehicle or are provided as a mobile device are generally known.

Map material is typically stored in transportation vehicle navigation systems, and the navigation system determines a current position of the transportation vehicle using a satellite navigation system, known generically as GNSS (global navigation satellite system), for instance, a system such as GPS, GLONASS, Galileo, etc.

The signals received from a GNSS system can also be combined with additional data, for instance, with sensor signals from the transportation vehicle that are indicative of the transportation vehicle status (wheel speed sensors and the like).

It is also known to improve further the accuracy of the signals received from the GNSS system, as described below.

In what is known as the AGNSS system (assisted global network satellite system), the GNSS position data is corrected by correction data that takes into account, for instance, deviations of the satellites from their orbit and disturbances in the ionosphere. DGNSS (differential GNSS) uses correction data from ground stations. In addition to data from the GNSS satellites, orbit data from other satellites can also be used (e.g., SBAS, satellite based augmentation system) to increase the position accuracy. The AGNSS or SBAS correction data can be retrieved, for example, over a wireless communications link.

For GNSS chips in navigation systems, it is also known to assess the signal quality. The GNSS chip uses for this purpose DOP (dilution of precision) values, which take into account the number of visible satellites and the satellite configuration, and for a given satellite constellation at a specific location specify how well this constellation is suited to the measurement. The GNSS chip can also use the signal-to-noise ratio (SNR), which gives the quality of the signal as the quotient between signal and noise.

It is also known that the quality of the GNSS geo-locating is dependent on obstructions between the transmitting satellite and the receiving navigation device. For instance, the signal from a satellite may be blocked by structures, a process also known as "shadowing". This happens, for instance, in streets containing high buildings, in tunnels, in underground parking garages, in roads arranged one above the other, underpasses and the like. Moreover, satellite signals can be reflected by structures. In addition, atmospheric disturbances or interference sources such as clouds, short-term scintillations in the ionosphere, precipitation or even increased signal reflection from objects (foliage, buildings, mountains) as a result of precipitation, can have a negative impact on the signal quality and hence the quality of the GNSS geo-locating.

The Chinese laid-open application CN 102735251 A shows a Cloud-based GPS navigation system for a navigation device. To reduce the processing load on the navigation device, position data and destination data are sent to a remote computer, which calculates the route to the destination and sends the route back to the navigation device.

The US patent publication US 2008/0293426 A1 discloses providing different modes for finding the position of a mobile device. If the position of the mobile device cannot be found using a first mode, then a quality of service of the position-finding is reduced and the position-finding is performed using a different mode of lower quality of service. In addition, the quality of service can be determined on the basis of further parameters such as also environmental conditions, for instance.

The international publication WO 2015/126499 relates to SLAM (simultaneous localization and mapping) technology. It shows that SLAM can be performed only using GNSS data. GNSS signals that are shadowed or reflected, for example, by a building or other obstructions can be identified from the SNR. Such SNR data can originate from many different sources, for instance, from different GNSS receivers. This SNR data can be combined, and the location of such obstructions determined therefrom.

Although the two publications discussed show in principle ways of taking into account obstructions between a navigation device and a satellite signal, the solutions disclosed in these publications do not allow full account to be taken of such obstructions.

Therefore, the disclosed embodiments provide a navigation method and a navigation device that overcome at least some of the abovementioned drawbacks and allow better account to be taken of obstructions.

This is achieved by the disclosed navigation method and by the disclosed navigation device.

A first disclosed embodiment provides a navigation method, comprising:

receiving a satellite navigation signal from a satellite navigation system;

determining a position on the basis of the received satellite navigation signal;

obtaining quality data, which specifies a satellite navigation signal quality according to location information; and correcting the determined position on the basis of the satellite navigation signal quality.

A second disclosed embodiment provides a navigation device comprising a memory, a communications interface and a processor, wherein the navigation device is configured to perform the method according to the first disclosed embodiment.

Another disclosed embodiment provides a navigation system comprising at least one navigation device according to the second disclosed embodiment and a computer, which is remote from the at least one navigation device and communicates with the at least one navigation device via a communications interface, and is configured to transmit to the navigation device the quality data that specifies a satellite navigation signal quality according to location information.

The disclosed navigation method comprises receiving a satellite navigation signal from a satellite navigation system, which was also referred to as GNSS in the introduction and may be a GPS, GLONASS, Galileo or another GNSS system, for example. The navigation method is used, for instance, to geo-locate a watercraft, an aircraft or a land transportation vehicle.

The satellite navigation signals typically come from satellites of the satellite navigation system, as is generally known to a person skilled in the art.

The navigation method also comprises determining a position on the basis of the received satellite navigation signal, as is generally known to a person skilled in the art. The present disclosure is obviously not limited to receiving a single satellite navigation signal, and the reference to a satellite navigation signal shall be understood in a purely functional sense. Thus, as is customary in the art, satellite navigation signals from a plurality of satellites (two, three, four, etc.) can also be used to determine the position. Equally, the present disclosure is not limited to receiving only one satellite navigation signal from only one satellite navigation system, but rather a plurality of satellite navigation signals can be received from one or even from a plurality of satellite navigation systems, and the position determined on the basis thereof.

In addition, quality data is obtained that specifies a satellite navigation signal quality according to location information. The location information is indicative of the location for which the satellite navigation signal quality is specified. The location information may be available as coordinates or the like, for instance. By matching the determined position to the location information, it is hence possible to obtain the associated satellite navigation signal quality for the determined position. This quality data may be available locally, e.g., in a memory of a navigation device that performs the method described in this document and that is described in greater detail below, or it can also be obtained from the "Cloud", i.e., for example, from a remote computer, for instance, by retrieval therefrom. Obviously the "remote computer" or the "Cloud" shall be understood here in a purely functional sense and can refer to any number of processors, servers, computer clusters, mainframe computer centers or the like.

Communication with the remote computer (with the "Cloud") can be performed, for instance, via a wireless interface, which in general transmits data via a wireless network such as a cellular network (GSM (Global System for Mobile Communications), UMTS (Universal Mobile Telecommunications System), etc.) or WLAN (wireless local area network) or the like. In this case, the data can be obtained via a network or even the Internet.

The determined position is corrected on the basis of the obtained satellite navigation signal quality. For instance, in this process, satellite navigation signals of low satellite navigation signal quality can be ignored or given a lower weighting than satellite navigation signals of high quality.

Determining the position can hence take into account obstructions or interference that may cause degradation of the received satellite navigation signals, such as the structures, atmospheric disturbances or the like mentioned in the introduction. It is consequently possible to take into account location-dependent and/or time-dependent interference.

Since the obtained quality data specifies the satellite navigation signal quality according to location information, in principle the satellite navigation signal quality can be specified for any location. The satellite navigation signal quality, as also already mentioned in the introduction, is lower, for instance, if the satellite navigation signal has been reflected by a building or cannot be received from a satellite at all primarily because of a structural, geological or other obstruction in the line of sight between satellite and navigation device, or more specifically its antenna.

The quality data can be obtained as often as required, e.g., for a specific geographic region of defined extent, every time the transportation vehicle is stationary (e.g., at each junction), after a defined time period, etc. The quality data can hence be retrieved for numerous different locations at once or, for instance, on the basis of the currently determined position.

The quality data obtained can be available in any form, for instance, as a table, as map data, i.e., vector data, etc. provided there is an association between location information and a satellite navigation signal quality. The satellite navigation signal quality may be available, for example, as satellite navigation signal quality values, as is generally known to a person skilled in the art. The spatial resolution of the quality data can be selected to be as precise or imprecise as required, and the present disclosure is not fixed at a specific precision. In some exemplary embodiments, the precision equals approximately one street block, i.e., a segment from one junction to the next.

The exemplary embodiments hence have the following benefits. In some exemplary embodiments, a cost saving is possible for the transportation vehicle and/or its navigation device, and the computational effort in the transportation vehicle and/or in the navigation device can be reduced. In addition, data from other transportation vehicles and/or navigation devices can be incorporated, and the quality data can be kept correspondingly up to date, as was explained earlier. The geo-locating accuracy can hence be improved by incorporating location-dependent and time-dependent interference sources (as described above, structural obstructions, geographic obstructions, weather effects). A dedicated quality assessment for the individual satellites is possible in some exemplary embodiments, and a comparative analysis of data, for instance, provided by numerous transportation vehicles, can improve the calculation of the satellite navigation signal quality, as is also explained further below.

As already mentioned above, in some exemplary embodiments, the quality data is obtained via a "Cloud", i.e., a remote computer. It is possible to guarantee that the quality data is up to date, for instance, by updating it regularly. Special measuring transportation vehicles or the like, which, for example, in population centers selectively drive down streets to obtain current satellite navigation signal quality values, can be used to achieve the updating. The quality data can also be updated, however, from data that is provided, for instance, by navigation devices in transportation vehicles or the like, as is also described further later. In some exemplary embodiments, yet more data can also be used to obtain current satellite navigation signal quality values. The data may be, for instance, meteorological data, which may contain information on short-term atmospheric disturbances, weather data, weather forecast data or the like.

In addition, the necessary computing power for producing the quality data that specifies the satellite navigation signal quality according to location information, can be available in the Cloud, so that a navigation device, for instance, needs to be furnished with only a small amount of computing power.

Analysis and refinement of the calculation by what are known as big-data techniques can also be implemented in the Cloud, for instance, techniques such as extensive collection of data from numerous navigation devices or the like.

In some exemplary embodiments, the quality data that specifies the satellite navigation signal quality according to location information can be pre-calculated and, for instance, stored and retrieved via an additional layer in map databases (locally or in the Cloud, a network memory or the like).

The satellite navigation signal quality can be specified additionally according to a satellite of the satellite navigation system. It is thereby possible to specify a dedicated satellite navigation signal quality for each satellite that is available at the relevant location. Satellite navigation signals coming from a particular satellite, for instance, can hence be ignored or, for example, given a low weighting in the position determination so that the impact of the satellite navigation signal can be reduced accordingly.

In some exemplary embodiments, the satellite navigation signal quality is specified additionally according to a time value. It is thereby possible to respond to time-dependent events, such as may arise, for instance, during atmospheric disturbances (clouds, thunderstorms, heavy rain, snowfall or the like) or even during roadworks or the like.

In some exemplary embodiments, the satellite navigation signal quality is specified additionally according to an angle range. It can thereby be ascertained whether or not the received satellite navigation signal is within the specified angle range, and the determined position can be corrected accordingly.

In addition, the determined position can be transmitted to a remote computer, for instance, so that in response thereto, the remote computer can transmit the quality data, which specifies a satellite navigation signal quality according to location information, specifying the satellite navigation signal quality for the determined position (and the area around this position).

In some exemplary embodiments, data that is indicative of a satellite navigation signal quality of the received satellite navigation signal is additionally transmitted to a remote computer. The data may specify, for instance, a signal-to-noise ratio for the received satellite navigation signal. This data can be collected and analyzed by the remote computer, and the quality data, which specifies a satellite navigation signal quality according to location information, can thereby be improved or updated accordingly.

In addition, sensor data that is indicative of a driving status of a transportation vehicle can additionally be obtained, and the position can be corrected additionally on the basis of the sensor data. It is known to use sensor data that indicates, for example, the wheel speed of each wheel, the turning direction of the transportation vehicle, the acceleration, etc. to determine the driving status of the transportation vehicle. This sensor data can be used to determine how fast and in what direction a transportation vehicle is travelling. For instance, if a start position in a map is known for the transportation vehicle, then the current position of the transportation vehicle at a particular time can be determined solely on the basis of the sensor data. This process can achieve a high accuracy, in particular, over a short timescale, and can be used for correcting the determined position.

It is hence possible to determine additionally a difference between the corrected position that is corrected on the basis of the satellite navigation signal quality, and the corrected position that is corrected additionally on the basis of the sensor data, whereby it is possible to improve the position accuracy further.

Moreover, data that is indicative of the determined difference can additionally be transmitted to a remote computer. The remote computer can use the difference to update or correct the quality data, which specifies a satellite navigation signal quality according to location information. In some exemplary embodiments, the remote computer consequently produces the quality data on the basis of the position sent to the computer, the satellite navigation signal quality and/or the difference.

Some exemplary embodiments relate to a navigation device, which comprises a memory, a communications interface and a processor. The navigation device is configured to perform the method described in this document.

The communications interface may provide wireless communication and/or wired communication, in particular, wireless communication to the remote computer ("Cloud"), as has already been described above (e.g., by cellular communication, WLAN, etc.).

The navigation device can also comprise a display, a loudspeaker or another outputs method or mechanism, for instance, to communicate navigation data, direction commands, a route or such like to a user.

The navigation device can be designed to be portable (mobile) or can also be fixedly integrated, for example, in a transportation vehicle.

The navigation device can be configured to retrieve the quality data, which specifies a satellite navigation signal quality according to location information, from its memory or from the remote computer (from the "Cloud") after a defined time period and/or according to the determined position, whereby the quality data can be retrieved as required and hence, for example, transmission capacities can be saved. The defined time period may be a time interval here (daily, weekly etc.), a journey duration (1 h, 2 h, etc.), a usage period, etc. In addition, for example, it is possible to compare the determined position with the location information and thereby verify whether the quality data is applicable to the current determined position. If it is no longer applicable, new quality data can be retrieved, which then, for instance, is applicable to a future position. For this purpose, the locations for which the quality data will be needed in future can be predicted, for example, on the basis of the current driving direction.

Some exemplary embodiments relate to a navigation system, which comprises at least one navigation device as described in this document, and a computer, which is remote from the at least one navigation device and communicates with the at least one navigation device via a communications interface, and is configured to transmit to the navigation device the quality data that specifies a satellite navigation signal quality according to location information.

The remote computer can also be configured to produce the quality data on the basis of the position sent to the computer, the satellite navigation signal quality and/or the difference, as was also already explained above.

The navigation system can also comprise a database, in which is stored the quality data. The database may be located directly in the computer, for instance, on a suitable storage medium, or placed in a dedicated memory, for instance, a memory accessible via a network.

The navigation method described in this document can also be implemented as a computer program comprising commands that cause a computer to perform the navigation method. The computer program can also be stored on a suitable storage medium, exist as data or be provided as a data stream.

Although the disclosure has been described mainly with reference to a transportation vehicle, it can also be implemented in other entities, for instance, in a computer, a smartphone, a digital camera or the like.

Figure 2:
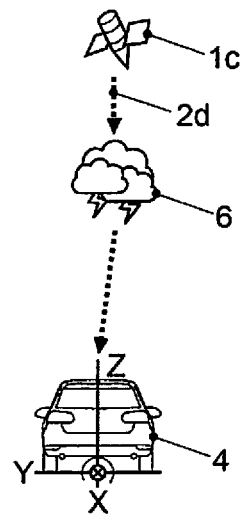
FIG. 2 illustrates schematically interference of satellite signals by an atmospheric disturbance.

FIGS. 1 and 2 illustrate how interference of satellite signals coming from satellites 1-c and propagating on signal propagation paths 2a-d can occur, as mentioned in the introduction.

In FIG. 1, notionally two satellites 1a and 1b of a satellite navigation system, e.g., GPS, transmit satellite signals to Earth. The satellite 1a transmits a satellite navigation signal to Earth on a signal propagation path 2a, which signal can be received by a navigation device in a transportation vehicle 4 traveling along a street 5 between buildings 3a-3d. There is no obstruction in the line of sight between the transportation vehicle 4 and the satellite 1a, and therefore the satellite navigation signal on the signal propagation path 2a can be received with a high satellite navigation signal quality.

The satellite 1b transmits a satellite navigation signal to Earth, which at one point in time, on its signal propagation path 2b, is reflected by the building 3b, and at another time, on its signal propagation path 2c, is shadowed by the building 3c. Therefore the satellite navigation signals that arrive at the transportation vehicle 5 via the two signal propagation paths 2b and 2c, and hence on two different paths, have a satellite navigation signal quality that is lower than the satellite navigation signal quality of the satellite navigation signal received via the signal propagation path 2a. The attenuation of the satellite navigation signal on the signal propagation path 2c can be so strong in this case that it can no longer be used by a navigation device in the transportation vehicle 5.

FIG. 2 shows an atmospheric disturbance 6, a storm cloud, which attenuates a satellite navigation signal which comes from the satellite 1d and runs on a signal propagation path 2d and which hence is received with poor satellite navigation signal quality by the navigation device of the transportation vehicle 4. As mentioned above, other atmospheric disturbances may also exist, in particular, also interference caused indirectly by the atmospheric disturbance, for instance, interference such as increased reflection from objects (trees, buildings, mountains) as a result of precipitation.

Figure 3:
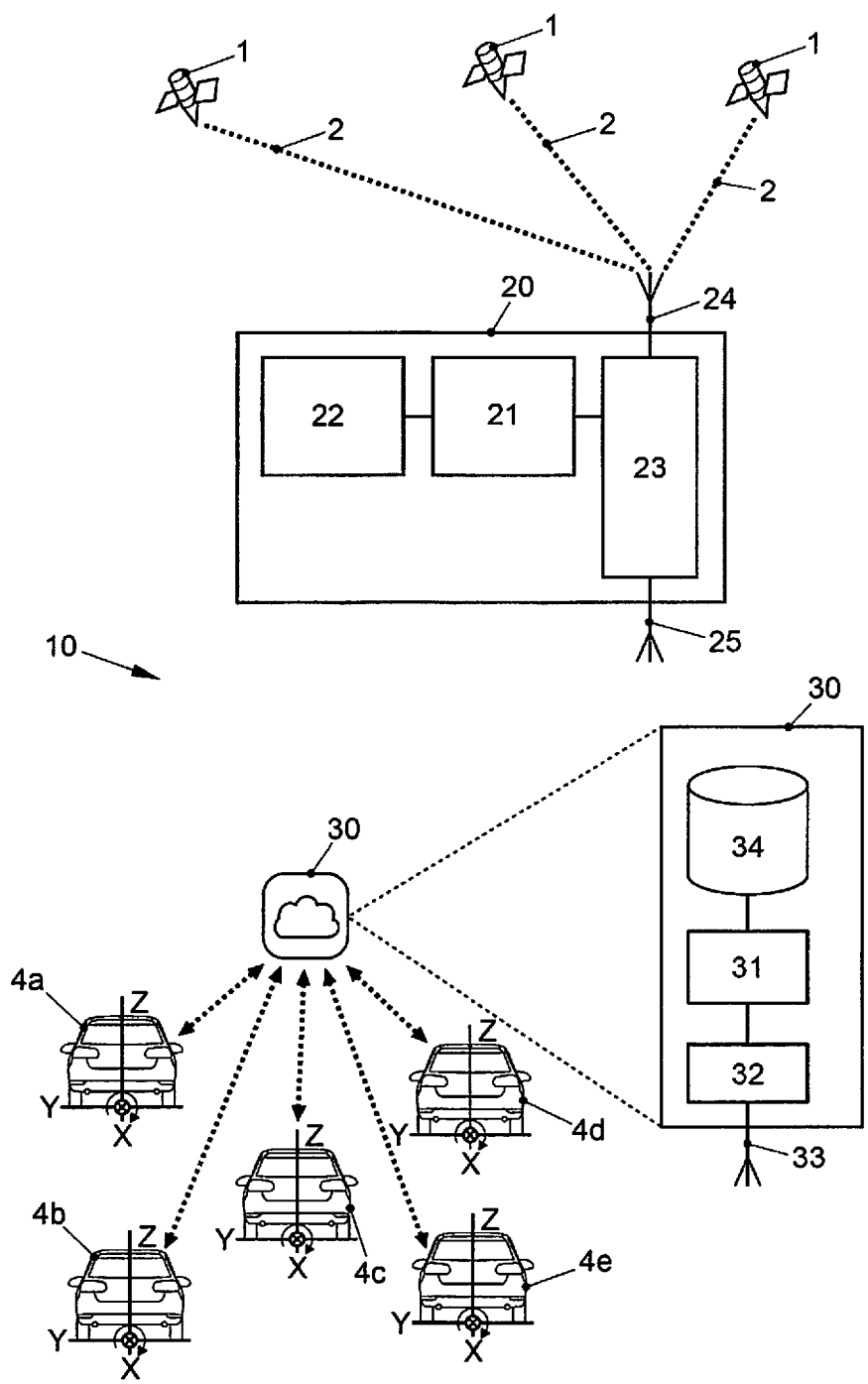
FIG. 3 shows an exemplary embodiment of a navigation device and of a navigation system.

FIG. 3 shows a navigation system 10 comprising three satellites 1 of a satellite navigation system, as already described above. It also shows in detail by way of example a navigation device 20 as provided, for example, in the transportation vehicles 4a to 4e.

The navigation device 20 has a processor 21, which is connected to a memory 22 and a communications interface 23. The communications interface 23 has an antenna 24, via which it receives satellite navigation signals from the satellites 1 via signal propagation paths 2, and it has an antenna 25, via which it can communicate by cellular communication with a remote computer ("Cloud") 30. As also explained already above, in other exemplary embodiments, the quality data and also other relevant data can be stored locally in the navigation device 20 in a suitable memory, and updated only as required, for instance, via a wired interface (USB (universal serial bus), Ethernet or the like) or wireless interface (WLAN (wireless local area network), BLUETOOTH® or the like). In such exemplary embodiments, the antenna 25 and the communication with the remote computer can be obsolete.

The remote computer 30 has a processor 31, a communications interface 32, which has a cellular communication antenna 33, and a database 34. The individual navigation devices 20 can communicate wirelessly with the remote computer 30 by cellular communication.

Figure 4:
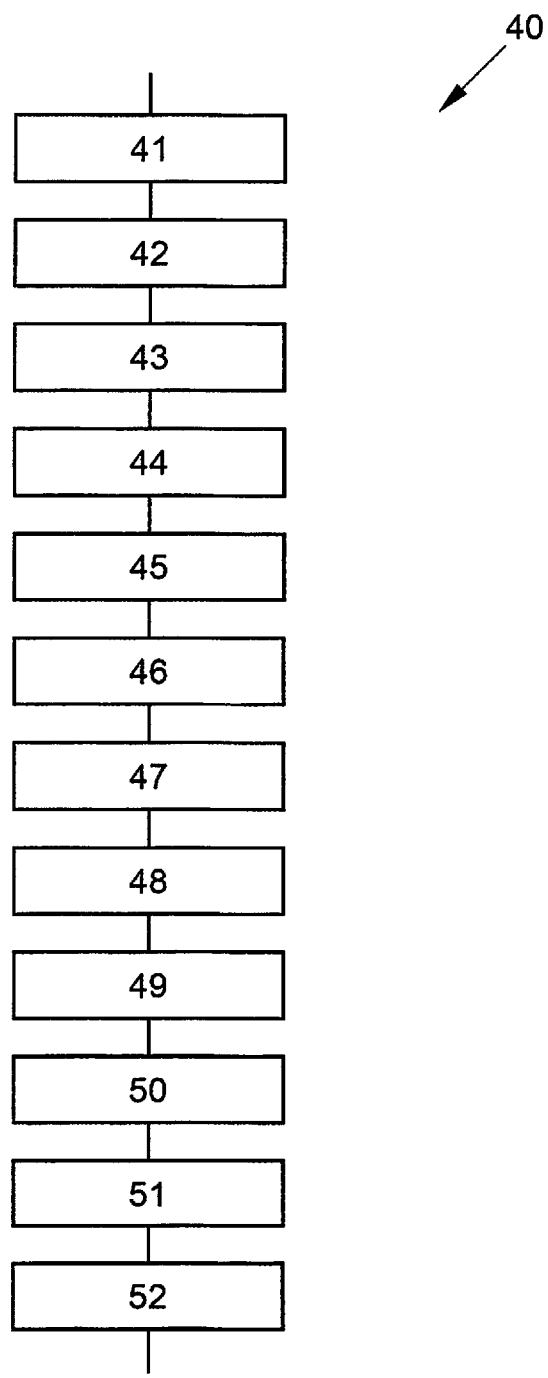
FIG. 4 shows an exemplary embodiment of a navigation method.

The operating principle of the navigation system 10, of the navigation device 20 and of the remote computer 30 is explained below with reference to the navigation method 40 shown in FIG. 4.

In 41, the navigation device 20 receives the satellite navigation signals from the satellites 1 via the signal propagation paths 2, and, in 42, determines on the basis thereof a current position of the transportation vehicle 4 in which it is integrated, and in a manner also generally known to a person skilled in the art.

In 43, the navigation device 20 requests (for instance, whenever the transportation vehicle 4a-e stops, as happens at a junction) from the remote computer 30 quality data, which specifies a satellite navigation signal quality according to location information. In 44, the remote computer 30 retrieves for this purpose the relevant quality data from its database 34, and, in 45, it transmits the quality data to the navigation device 20 by cellular communication.

As also already explained above, the scope of the quality data can vary. For instance, it may contain just a pure evaluation of the satellite navigation signal quality for the current location. It is also possible, however, that it contains additionally a satellite navigation signal quality for the current time (or current time range), a satellite navigation signal quality specific to an angle range for the satellite reception, e.g., for heading and azimuth, and/or to each individual satellite 1 for the current location or the current position in which the transportation vehicle 4 (or 4a-e) comprising the navigation device 20 is located.

On the basis of the quality data obtained from the remote computer 30 ("Cloud"), in 46, the navigation device 20 corrects the determined position, for instance, by ignoring, or giving a low weighting to, satellite navigation signals via the signal propagation paths 2b,c,d (FIGS. 1 and 2), which signals have a correspondingly poor, i.e., low, satellite navigation signal quality because they come from satellites 1b,c (FIGS. 1 and 2) for which an obstruction is in the way on the path to the navigation device 20, which obstruction acts like a signal filter, or have other interference such as was also already described above, for instance, interference such as an atmospheric disturbance, a reflection or the like.

Thus in the geo-locating process, for example, the selection of the employed satellites that are used to determine the position of the navigation device 20 is controlled dynamically. In addition, overall the weighting of the geo-locating by the satellite navigation system can also be adapted dynamically with respect to other geo-locating mechanisms for the final position determination. Other geo-locating mechanisms are based, for instance, on sensor data that indicates the current transportation vehicle status at a particular time and can be used accordingly for position determination, as explained above.

In addition, in 47, the navigation device 20 can determine, for example, the satellite navigation signal quality that it receives at the antenna 24, for instance, as a signal-to-noise parameter (SNR parameter). Moreover, in 48, the navigation device can calculate a difference from the corrected position determined in 46, and a position that was determined, as described, on the basis of the transportation vehicle status obtained using sensor data.

Hence, in 49, the navigation device 20 can transmit data to the remote computer 30, which data contains, for example, the satellite navigation signal quality determined by the navigation device 20 and/or the determined difference, and which also contains the current position of the navigation device 20.

In 51, the remote computer 30 can receive this data from the navigation device 20, for instance, from the transportation vehicles 4a-e, as explained above.

This provided data can be used to improve the internal calculations, in particular, the quality data. In 52, the quality data in the database 34 is accordingly updated by the remote computer on the basis of the data received from the navigation devices 20 of the transportation vehicles 4a-e.

The scope of the data that the navigation devices 20 of the transportation vehicles 4a-e transmit to the remote computer 30 in 49 can contain various information, namely the current position of the transportation vehicle 4a-e, values of the measurement of the satellite navigation signal quality via the antenna 24 (e.g., SNR values of the satellite navigation signals received via the signal propagation paths 2), and/or the values of the differences of the determined corrected position from the final geo-locating using the transportation vehicle sensors and the associated sensor data.

Of course the navigation device 20 can perform other corrections to the determined position, as is known in the prior art and as was mentioned in the introduction.

LIST OF REFERENCES

1, a-c satellites
2, a-d signal propagation paths of satellite navigation signals
3a-d building
4,a-e transportation vehicle having navigation device
5 street
6 atmospheric disturbance (storm cloud)
10 navigation system
20 navigation device
21 processor
22 memory
23 communications interface
24 25 antennas
30 remote computer ("Cloud")
31 processor of 30
32 communications interface of 30
33 cellular communication antenna
34 database
40 navigation method
41 received satellite navigation signal
42 determined position
43 request quality data
44 retrieve quality data from database
45 transmit quality data to 20
46 correct the determined position
47 determine satellite navigation signal quality
48 determine difference
49 transmit data to 30
51 receive data by 30
52 update quality data

The invention claimed is:

1. A navigation method for a transportation vehicle, comprising:

receiving a satellite navigation signal from a satellite navigation system;
determining a position of the transportation vehicle based on the received satellite navigation signal;
obtaining quality data, which specify a satellite navigation signal quality according to location information based on the determined position;
comparing the determined position with the location information; and
correcting the determined position to a corrected position based on the satellite navigation signal quality,
wherein sensor data that is indicative of a driving status of the transportation vehicle, is obtained, and wherein the corrected position is further corrected to a further corrected position based on the sensor data,
wherein a difference is determined between the corrected position that is corrected based on the satellite navigation signal quality, and the further corrected position that is corrected based on the sensor data, and
wherein data that is indicative of the determined difference is transmitted to a remote computer, to update or correct the good data indicating a good satellite navigation signal depending on a location information.

2. The navigation method of claim 1, wherein the quality data is obtained from a remote computer.

3. The navigation method of claim 1, wherein the satellite navigation signal quality is specified according to a satellite of the satellite navigation system.

4. The navigation method of claim 1, wherein the satellite navigation signal quality is specified according to a time value.

5. The navigation method of claim 1, wherein the satellite navigation signal quality is specified according to an angle range.

6. The navigation method of claim 1, wherein the determined position is transmitted to a remote computer.

7. The navigation method of claim 1, wherein data that is indicative of a satellite navigation signal quality of the received satellite navigation signal is transmitted to a remote computer.

8. A navigation device for a transportation vehicle, comprising:
a memory;
a communications interface; and
a processor,
wherein the navigation device performs a navigation method wherein a satellite navigation signal is received from a satellite navigation system, a position of the transportation vehicle is determined based on the received satellite navigation signal, quality data are obtained, which specify a satellite navigation signal quality according to location information based on the determined position, the determined position is compared with the location information, the determined position is corrected to a corrected position based on the satellite navigation signal quality, a difference is determined between the corrected position that is corrected based on the satellite navigation signal quality, and the further corrected position that is corrected based on the sensor data, and data that is indicative of the determined difference is transmitted to a remote computer, to update or correct the good data indicating a good satellite navigation signal depending on a location information.

9. The navigation device of claim 8, wherein the quality data is obtained from a remote computer.

10. The navigation device of claim 8, wherein the satellite navigation signal quality is specified according to a satellite of the satellite navigation system.

11. The navigation device of claim 8, wherein the satellite navigation signal quality is specified according to a time value.

12. The navigation device of claim 8, wherein the satellite navigation signal quality is specified according to an angle range.

13. The navigation device of claim 8, wherein the determined position is transmitted to a remote computer.

14. The navigation device of claim 8, wherein data that is indicative of a satellite navigation signal quality of the received satellite navigation signal is transmitted to a remote computer.

\* \* \* \* \*